(12) United States Patent
Hong et al.

(10) Patent No.: US 11,384,199 B2
(45) Date of Patent: Jul. 12, 2022

(54) POLYMER COMPOSITION CONTAINING POLYALKYLENE CARBONATE RESIN AND FILM USING THE SAME

(71) Applicant: SK Innovation Co., Ltd., Seoul (KR)

(72) Inventors: Seung Gweon Hong, Daejeon (KR); Hye Lim Kim, Daejeon (KR); Jae Myoung Son, Daejeon (KR); Yun Kyun Lee, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 392 days.

(21) Appl. No.: 16/499,564

(22) PCT Filed: Mar. 29, 2018

(86) PCT No.: PCT/KR2018/003705
§ 371 (c)(1),
(2) Date: Sep. 30, 2019

(87) PCT Pub. No.: WO2018/182328
PCT Pub. Date: Oct. 4, 2018

(65) Prior Publication Data
US 2021/0102028 A1 Apr. 8, 2021

(30) Foreign Application Priority Data

Mar. 29, 2017 (KR) .................. 10-2017-0040301
Mar. 28, 2018 (KR) .................. 10-2018-0036147

(51) Int. Cl.
| | | |
|---|---|---|
| *C08L 69/00* | (2006.01) | |
| *C08L 73/00* | (2006.01) | |
| *C08L 67/04* | (2006.01) | |
| *C08G 64/02* | (2006.01) | |
| *C08G 67/02* | (2006.01) | |
| *C08J 5/18* | (2006.01) | |

(52) U.S. Cl.
CPC ......... *C08G 64/0208* (2013.01); *C08G 67/02* (2013.01); *C08J 5/18* (2013.01); *C08L 67/04* (2013.01); *C08L 69/00* (2013.01); *C08L 73/00* (2013.01); *C08L 2203/16* (2013.01); *C08L 2203/30* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | |
|---|---|---|
| 4,843,144 A | 6/1989 | Van Broekhoven et al. |
| 4,880,908 A | 11/1989 | Lutz et al. |
| 6,310,220 B1 | 10/2001 | Schmitter et al. |
| 6,573,340 B1 | 6/2003 | Khemani et al. |
| 10,844,220 B2 | 11/2020 | Park et al. |
| 10,941,261 B2 | 3/2021 | Kim et al. |
| 10,941,291 B2 | 3/2021 | Park et al. |
| 2006/0274560 A1 | 12/2006 | Rastogi et al. |
| 2009/0065730 A1 | 3/2009 | Yoshino et al. |

FOREIGN PATENT DOCUMENTS

| | | |
|---|---|---|
| EP | 3467035 A1 | 4/2019 |
| EP | 3524643 A2 | 8/2019 |
| EP | 3533833 A2 | 9/2019 |
| GB | 2322861 A | 9/1998 |
| JP | H101601 A | 1/1998 |
| JP | 2008255349 A | 10/2008 |
| KR | 1020080015454 A | 2/2008 |
| KR | 1020090090154 A | 8/2009 |
| KR | 1020100013255 A | 2/2010 |
| KR | 1020100067593 A | 6/2010 |
| KR | 1020160057929 A | 5/2016 |
| KR | 1020160059900 A | 5/2016 |
| KR | 1020170062561 A | 6/2017 |
| WO | WO2018212488 | * 11/2018 |

OTHER PUBLICATIONS

Korean application 10-2016-0180486 filed Dec. 27, 2016 (not a publication). (Year: None) (Year: None).*
Korean application 10-2016-0180048 filed Dec. 27, 2016 (not a publication). (Year: None) (Year: None).*
Korean application 10-2016-0180049 filed Dec. 27, 2016 (not a publication). (Year: None) (Year: None).*
Korean application 10-2017-0061116 filed May 17, 2017 (not a publication). (Year: None) (Year: None).*
Korean application 10-2017-0091100 filed Jul. 18, 2017 (not a publication). (Year: None) (Year: None).*
Korean application 10-2017-0180257 filed Dec. 26, 2017 (not a publication). (Year: None) (Year: None).*
Korean application 10-2016-0180266 filed Dec. 26, 2017 (not a publication). (Year: None) (Year: None).*
Korean application 10-2016-0180269 filed Dec. 26, 2017 (not a publication). (Year: None) (Year: None).*
Translation of Korean application 10-2016-0180486 filed Dec. 27, 2016 (not a publication). (Year: None) (Year: None).*
Chen et al., "Preparation and properties of biodegradable polymethylethylene carbonate/polylactic acid blend composite". Polymer Materials Science and Engineering, May 2010, vol. 26, No. 3, 5 pages. (English-language Abstract).

* cited by examiner

*Primary Examiner* — David J Buttner
(74) *Attorney, Agent, or Firm* — The Webb Law Firm

(57) ABSTRACT

The present invention relates to a polymer composition having improved processability by containing a polyalkylene carbonate resin and a film using the same.

12 Claims, 1 Drawing Sheet

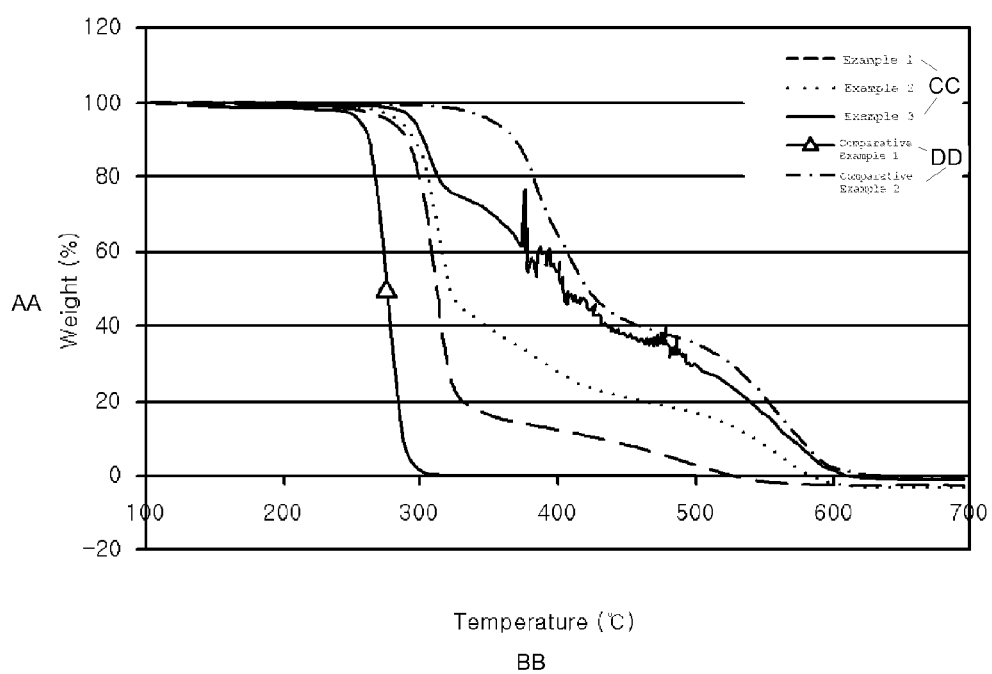
AA ... Weight (%)
BB ... Temperature (°C)
CC ... Example
DD ... Comparative example

POLYMER COMPOSITION CONTAINING POLYALKYLENE CARBONATE RESIN AND FILM USING THE SAME

CROSS-REFERENCE TO RELATED APPLICATIONS

This application is the United States national phase of International Application No. PCT/KR2018/003705 filed Mar. 29, 2018, and claims priority to Korean Patent Application Nos. 10-2017-0040301 and 10-2018-0036147, filed Mar. 29, 2017 and Mar. 28, 2018, respectively, the disclosures of which are hereby incorporated by reference in their entirety.

TECHNICAL FIELD

The present invention relates to a polymer composition having improved processability by containing a polyalkylene carbonate resin and a film using the same.

BACKGROUND ART

In accordance with reduction of petrochemical materials due to global warming and depletion of fossil fuels, studies have been actively carried out to replace petrochemical plastic with bioplastic on the basis of an environment-friendly raw material.

However, the bioplastic that has been studied so far does not have physical properties such as strength, water resistance, molding processability, thermal resistance, and the like for replacing conventional petrochemical plastic, and studies have been actively carried out to improve this problem.

A polyketone resin has excellent physical properties such as dimensional stability and the like and is an environment-friendly material, but normal extrusion of the polyketone resin is not performed when processed alone in order to produce a molded product due to a sharp increase in viscosity.

DISCLOSURE

Technical Problem

In order to solve the above problem, an object of the present invention is to improve extrusion processability of polyketone. More specifically, the object of the present invention is to enable thermal processing such as extrusion, injection, blowing, and the like by suppressing a sharp increase in viscosity when extruding.

Further, the object of the present invention is to improve thermal stability and processability of a polymer composition containing polyketone.

Technical Solution

In one general aspect, a polymer composition contains a polyalkylene carbonate resin and a polyketone resin.

In another general aspect, a polymer composition contains a polyalkylene carbonate resin, a polyketone resin, and a bio-sourced polyester resin.

In another general aspect, a molded product using the polymer composition is provided.

In another general aspect, a processing aid contains a polyalkylene carbonate resin and is for improving thermal processability of one resin or a mixed resin selected from a polyketone resin and a bio-sourced polyester resin.

Advantageous Effects

The polymer composition of the present invention has excellent processability and thermal stability, and may be subjected to various thermal processing such as extrusion, injection, blowing, and the like.

Accordingly, the polymer composition may be applicable to industrial fields such as various films, sheets, electronic products, interior materials for automobiles, and the like.

DESCRIPTION OF DRAWINGS

FIG. 1 is a graph obtained by measuring thermal stability of a polymer composition according to examples and comparative examples.

BEST MODE

Hereinafter, the present invention will be described in more detail with reference to specific examples. However, the following specific examples and examples are only one reference example for describing the present invention in detail, and the present invention is not limited thereto and may be implemented in various forms.

Unless otherwise defined, all technical terms and scientific terms used herein have the same meaning as commonly understood by a person skilled in the art to which the present invention belongs. The terms used herein are only for effectively describing a certain specific example rather than limiting the present invention.

The term "bio-sourced polyester resin" in the present invention refers to a polyester resin produced from a plant resource. More specifically, the term "bio-sourced polyester resin" refers to a polyester resin produced by polymerizing monomers produced from a plant resource called biomass by biological technology.

In the present invention, the "polymer composition" may be a blend.

According to a first embodiment of the present invention, there is provided a polymer composition containing a polyalkylene carbonate resin and a polyketone resin.

In the first embodiment of the present invention, the polymer composition may further contain a bio-sourced polyester resin.

In the first embodiment of the present invention, a content of the bio-sourced polyester resin contained in the polymer composition may be 3 to 50 wt %.

In the first embodiment of the present invention, the bio-sourced polyester resin may be one or a mixture of two or more selected from the group consisting of polylactic acid, polybutylene succinate, polyhydroxybutyrate, polybutylene adipate terephthalate, and copolymers thereof.

In the first embodiment of the present invention, a content of the polyalkylene carbonate resin contained in the polymer composition may be 1 to 99 wt %.

In the first embodiment of the present invention, a content of the polyalkylene carbonate resin contained in the polymer composition may be 20 to 80 wt %.

In the first embodiment of the present invention, the polyalkylene carbonate resin may be $C_2$-$C_{12}$ polyalkylene carbonate.

In the first embodiment of the present invention, the polyalkylene carbonate resin may be one or a mixture of two or more selected from the group consisting of polyethylene carbonate, polypropylene carbonate, polypentene carbonate, polyhexene carbonate, polyoctene carbonate, polycyclohexene carbonate, and copolymers thereof.

In the first embodiment of the present invention, the polyketone resin may be a linear alternating polyketone resin containing carbon monoxide and at least one kind of ethylenically unsaturated hydrocarbon.

In the first embodiment of the present invention, the polyketone resin may have a melting point of 175 to 300° C. and a melt mass-flow rate (MFR) of 1 to 30 g/10 min, the MFR being measured at 240° C. and 2.16 kg according to ASTM D1238.

In the first embodiment of the present invention, a viscosity of the polymer composition may satisfy the following Expressions 1 and 2.

$$A1>A2 \quad \text{[Expression 1]}$$

In Expression 1, A1 is an initial viscosity of the polyketone resin measured at 240° C. and A2 is an initial viscosity of the polymer composition obtained by mixing the polyketone resin and the polyalkylene carbonate resin, the initial viscosity of the polymer composition being measured at 240° C.

$$A1>A3 \quad \text{[Expression 2]}$$

In Expression 2, A1 is an initial viscosity of the polyketone resin measured at 240° C. and A3 is viscosity of the polymer composition obtained by mixing the polyketone resin and the polyalkylene carbonate resin, the initial viscosity of the polymer composition being measured after performing annealing at 240° C. for 10 minutes.

In the first embodiment of the present invention, a pyrolysis temperature of the polymer composition defined as a temperature at which a weight reduction ratio of the polymer composition reaches 20% when measuring pyrolysis by a thermogravimetric analyzer may satisfy the following Expression 3.

$$T1<T2 \quad \text{[Expression 3]}$$

In Expression 3, T1 is a pyrolysis temperature of the polyalkylene carbonate resin and T2 is a pyrolysis temperature of the polymer composition obtained by mixing the polyketone resin and the polyalkylene carbonate resin.

In the first embodiment of the present invention, a molded product using the polymer composition, and more specifically, a film is provided.

According to a second embodiment of the present invention, there is provided a polymer composition containing a polyalkylene carbonate resin and a bio-sourced polyester resin.

In the second embodiment of the present invention, a content of the polyalkylene carbonate resin based on the total amount of polymer composition may be 1 to 99 wt %.

In the second embodiment of the present invention, the polyalkylene carbonate resin may be $C_2$-$C_{12}$ polyalkylene carbonate.

In the second embodiment of the present invention, the polyalkylene carbonate resin may be one or a mixture of two or more selected from the group consisting of polyethylene carbonate, polypropylene carbonate, polypentene carbonate, polyhexene carbonate, polyoctene carbonate, polycyclohexene carbonate, and copolymers thereof.

In the second embodiment of the present invention, the bio-sourced polyester resin may be one or a mixture of two or more selected from the group consisting of polylactic acid, polybutylene succinate, polyhydroxybutyrate, polybutylene adipate terephthalate, and copolymers thereof.

In the second embodiment of the present invention, by mixing the polyalkylene carbonate resin with the bio-sourced polyester resin and performing processing, a shear thinning property is imparted to the bio-sourced polyester resin and a load of processing is thus decreased, such that processability is improved and a range of a processing temperature is wide, as compared to a case where the bio-sourced polyester resin is used alone.

In the second embodiment of the present invention, the polymer composition may satisfy the following Expression 4.

$$P1<P2 \quad \text{[Expression 4]}$$

In Expression 4, P1 is a torque range when extruding the polymer composition and P2 is a torque range when extruding the bio-sourced polyester resin.

In the second embodiment of the present invention, a film using the polymer composition is provided.

In the second embodiment of the present invention, the film may satisfy the following Expression 5.

$$F1<F2 \quad \text{[Expression 5]}$$

In Expression 5, F1 is oxygen permeability of the film using the polymer composition and F2 is oxygen permeability of the bio-sourced polyester resin.

According to a third embodiment of the present invention, there is provided a processing aid containing a polyalkylene carbonate resin and for improving thermal processability of one resin or a mixed resin selected from a polyketone resin and a bio-sourced polyester resin.

Hereinafter, respective components of the present disclosure will be described in detail.

First, the first embodiment of the present invention will be described.

In the first embodiment of the present invention, the polyalkylene carbonate resin is not limited, and polyalkylene carbonate resins disclosed in Korean Patent Laid-Open Publication Nos. 2009-0090154, 2010-0067593, 2010-0013255, and the like which are published by SK INNOVATION CO., LTD. may be used.

Specifically, the polyalkylene carbonate resin may be a polycarbonate copolymer or a polycarbonate terpolymer obtained by reacting carbon dioxide with one or two or more epoxide compounds. In this case, the epoxide compound may be at least one selected from the group consisting of (C2-C20)alkylene oxide substituted or unsubstituted with halogen or alkoxy; (C4-C20)cycloalkylene oxide substituted or unsubstituted with halogen or alkoxy; and (C8-C20) styrene oxide substituted or unsubstituted with halogen, alkoxy, alkyl, or aryl. Specifically, examples of the alkoxy may include alkyloxy, aryloxy, aralkyloxy, and the like, and examples of the aryloxy may include phenoxy, biphenyloxy, naphthyoxy, and the like. The alkoxy, alkyl, or aryl may include a substituent selected from a halogen element or an alkoxy group.

More specifically, the polyalkylene carbonate resin may be produced by a copolymerization reaction of carbon dioxide with at least one epoxide compound selected from the group consisting of (C2-C20)alkylene oxide substituted or unsubstituted with halogen, (C1-C20)alkyloxy, (C6-C20) aryloxy, or (C6-C20)ar(C1-C20)alkyloxy; (C4-C20)cycloalkylene oxide substituted or unsubstituted with halogen, (C1-C20)alkyloxy, (C6-C20)aryloxy, or (C6-C20)ar(C1-C20)alkyloxy; and (C8-C20)styrene oxide substituted or unsubstituted with halogen, (C1-C20)alkyloxy, (C6-C20) aryloxy, (C6-C20)ar(C1-C20)alkyloxy, or (C1-C20)alkyl.

Specifically, examples of the epoxide compound include ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbornene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, and the like.

More specifically, the polyalkylene carbonate resin may be one or a mixture of two or more selected from the group consisting of polyethylene carbonate, polypropylene carbonate, polypentene carbonate, polyhexene carbonate, polyoctene carbonate, polycyclohexene carbonate, and copolymers thereof, but is not limited thereto.

The polycarbonate copolymer or terpolymer may be polymerized by using solution polymerization or bulk polymerization, and more specifically, may be polymerized by inputting carbon dioxide in the presence of one or more kinds of epoxide compounds and a catalyst and using an organic solvent as a reaction medium. As the solvent, aliphatic hydrocarbon such as pentane, octane, decane, and cyclohexane, aromatic hydrocarbon such as benzene, toluene, and xylene, and halogenated hydrocarbon such as chloromethane, methylene chloride, chloroform, carbon tetrachloride, 1,1-dichloroethane, 1,2-dichloroethane, ethyl chlororide, trichloroethane, 1-chloropropane, 2-chloropropane, 1-chlorobutane, 2-chlorobutane, 1-chloro-2-methylpropane, chlorobenzene, and bromobenzene may be used alone or in combination of two or more thereof. A pressure of carbon dioxide may be from an atmospheric pressure to 100 atm, and preferably from 5 atm to 30 atm. A polymerization temperature at the time of copolymerizing reaction may be 20 to 120° C., and preferably 50 to 90° C. More preferably, bulk polymerization using a monomer itself as a solvent may be performed.

In addition, a weight average molecular weight may be, but not limited to, 10,000 to 1,000,000 g/mol. The weight average molecular weight is a value obtained by gel permeation chromatography analysis and means a value measured by using 1260 Infinity available from Agilent Technologies Inc. with polystyrene as a standard sample. In this case, PL gel Olexis is used as a column.

In the first embodiment of the present invention, the content of the polyalkylene carbonate resin is 1 to 99 wt %, specifically 1 to 90 wt %, and more specifically 20 to 80 wt %, based on the entirety of the polymer composition, but is not limited thereto. Within the above range, it is enough that flowability of each of the polyketone resin and the biosourced polyester resin is improved to exhibit an effect of improving processability. In addition, it is possible to further widen a temperature range in which processing may be performed on the bio-sourced polyester resin, such that the polymer composition is applicable to a method of producing various molded products. That is, a molded product may be produced by various known molding methods such as extrusion, injection, blowing, and the like.

In the first embodiment of the present invention, a viscosity of the polyketone resin is sharply increased due to reaction such as aldol condensation when performing processing such as extrusion, which is problematic in thermal processing such as extrusion, but it is possible to suppress decomposition or a crosslinking reaction during thermal processing by mixing the polyketone resin with the polyalkylene carbonate resin, such that thermal processing, that is, processing by methods such as extrusion, injection, blowing, and the like may be performed. In addition, thermal stability of the composition is further improved.

The polyketone resin is a linear alternating polymer containing carbon monoxide and at least one kind of ethylenically unsaturated hydrocarbon. More specifically, the polyketone resin has a linear alternating structure, and may contain substantially carbon monoxide for each molecule of unsaturated hydrocarbon.

As a precursor for producing a polyketone resin, the ethylenically unsaturated hydrocarbon may be C1-C20 ethylenically unsaturated hydrocarbon and preferably C1-C10 ethylenically unsaturated hydrocarbon. In addition, the ethylenically unsaturated hydrocarbon may be aliphatic such as ethene and α-olefin, more specifically, propene, 1-butene, iso-butene, 1-hexene, and 1-octene, or may be aryl aliphatic including an aryl substituent on another aliphatic molecule, and specifically including an aryl substituent on an ethylenically unsaturated hydrocarbon molecule.

Examples of the aryl aliphatic hydrocarbon of the ethylenically unsaturated hydrocarbon may include styrene, p-methyl styrene, p-ethyl styrene, and m-isopropyl styrene.

A preferred polyketone resin may be a copolymer of carbon monoxide and ethane, second ethylenically unsaturated hydrocarbon containing carbon monoxide, ethane, at least three carbon atoms, or particularly an α-olefin-based terpolymer such as propene. Specifically, the polyketone resin may be a polymer having a repeating unit represented by the following Formulas 1 and 2. More specifically, Formula 2 may be represented by Formula 3.

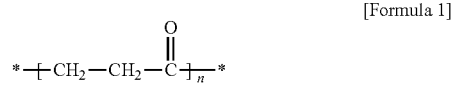

[Formula 1]

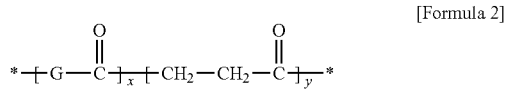

[Formula 2]

In Formula 2, a ratio of x to y may be 1:0.01 to 0.5.

G is derived from at least three ethylenically unsaturated hydrocarbon monomers polymerized through ethylenic unsaturation.

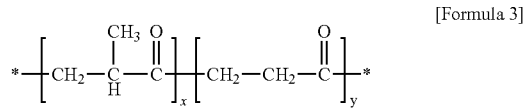

[Formula 3]

In Formula 3, a ratio of x to y may be 1:0.01 to 0.5.

The polyketone resin may have a number average molecular weight of 1,000 to 200,000 g/mol and more preferably 20,000 to 90,000, the number average molecular weight being measured by gel permeation chromatography. In addition, the polyketone resin may have a melting point of 175 to 300° C., and more specifically 210 to 270° C. In addition, the polyketone resin may have a melt mass-flow rate (MFR) of 1 to 30 g/10 min, and more specifically 1 to 10 g/10 min, the MFR being measured at 240° C. and 2.16 kg according to ASTM D1238.

An embodiment of a method of producing the polyketone resin is disclosed in U.S. Pat. No. 4,843,144.

The content of the polyketone resin in the polymer composition may be 1 to 99 wt %, more specifically 10 to 90 wt %, and still more specifically 20 to 80 wt %. Thermal resistance of the polymer composition may further be improved as the content of the polyketone is increased.

In the first embodiment of the present invention, a viscosity of the polymer composition may satisfy the following Expressions 1 and 2.

$$A1>A2 \quad \text{[Expression 1]}$$

In Expression 1, A1 is an initial viscosity of the polyketone resin measured at 240° C. and A2 is an initial viscosity of the polymer composition obtained by mixing the polyketone resin and the polyalkylene carbonate resin, the initial viscosity of the polymer composition being measured at 240° C., and $$A1>A3 \quad \text{[Expression 2]}$$

In Expression 2, A1 is an initial viscosity of the polyketone resin measured at 240° C. and A3 is viscosity of the polymer composition obtained by mixing the polyketone resin and the polyalkylene carbonate resin, the initial viscosity of the polymer composition being measured after performing annealing at 240° C. for 10 minutes.

That is, a sharp increase in viscosity of polyketone when performing thermal processing may be prevented by using the polyalkylene carbonate resin.

Accordingly, a torque when extruding may be further decreased according to a content range of the polyalkylene carbonate resin, and may be decreased by 30% or more, and more specifically by 35% or more within the range in which 20 wt % of the polyalkylene carbonate resin is contained.

In the first embodiment of the present invention, a pyrolysis temperature of the polymer composition defined as a temperature at which a weight reduction ratio of the polymer composition reaches 20% when measuring pyrolysis by a thermogravimetric analyzer may satisfy the following Expression 3.

$$T1<T2 \quad \text{[Expression 3]}$$

In Expression 3, T1 is a pyrolysis temperature of the polyalkylene carbonate resin and T2 is a pyrolysis temperature of the polymer composition obtained by mixing the polyketone resin and the polyalkylene carbonate resin.

That is, a polymer composition having excellent thermal resistance and thermal processability may be provided. More specifically, the pyrolysis temperature of the polymer composition may be further increased as the content of the polyketone resin is increased. As a specific example, the pyrolysis temperature of the polymer composition is lower than 300° C. in a case where a polyalkylene carbonate resin is used alone, but the pyrolysis temperature of the polymer composition obtained by mixing a polyketone resin and a polyalkylene carbonate resin is 300° C. or more and specifically 300 to 500° C., which may improve thermal stability. This may mean that the pyrolysis temperature is increased as the content of the polyketone resin is increased. It is confirmed that in a case where polyalkylene carbonate is used alone as shown in FIG. 1, the pyrolysis temperature is less than 300° C., and in a case where the content of the polyketone resin is 20 to 80 wt %, the pyrolysis temperature is increased to 300 to 500° C.

In addition, in the first embodiment of the present invention, the polymer composition may further contain a bio-sourced polyester resin, if necessary.

More specifically, the polymer composition of the first embodiment may contain a polyalkylene carbonate resin, a polyketone resin, and a bio-sourced polyester resin.

The bio-sourced polyester resin refers to a polymer produced by polymerizing monomers obtained by fermentation, more specifically, an aliphatic polyester resin produced by polymerizing monomers obtained by fermentation from starch, sugar, carbohydrate, fat, or vegetable oil, or an aliphatic-aromatic polyester resin based on a produced diol component on the basis of biomass.

As a more specific example, the bio-sourced polyester resin may be one or a mixture of two or more selected from the group consisting of polylactic acid, polybutylene succinate, polyhydroxybutyrate, polybutylene adipate terephthalate, and copolymers thereof. More preferably, the bio-sourced polyester resin may be polylactic acid.

A content of the bio-sourced polyester resin in the polymer composition may be, but not limited to, 3 to 50 wt % and more specifically 3 to 40 wt %.

Specifically, the polymer composition may contain 1 to 95 wt % of the polyalkylene carbonate resin, 3 to 40 wt % of the bio-sourced polyester resin, and a residual amount of polyketone resin.

More specifically, the polymer composition may contain 3 to 40 wt % of the polyalkylene carbonate resin, 3 to 40 wt % of the bio-sourced polyester resin, and a residual amount of polyketone resin. The polymer composition has excellent thermal resistance and thermal processability within the above content range, which is preferable.

In the first embodiment of the present invention, the polymer composition may satisfy the following Expression 4.

$$P1<P2 \quad \text{[Expression 4]}$$

In Expression 4, P1 is a torque range when extruding the polymer composition and P2 is a torque range when extruding the polyketone resin.

That is, in the present invention, by mixing the bio-sourced polyester resin and the polyketone resin, it is possible to further widen a processing temperature range of the original polyketone resin and achieve an effect of improving an extrusion performance. More specifically, a torque may be further decreased according to the content range of the polyalkylene carbonate resin, and may be decreased by 5% or more, and more specifically by 9% or more within the range in which 20 wt % or more of the polyalkylene carbonate resin is contained.

In the first embodiment of the present invention, a molded product is produced by methods such as extrusion, injection, blowing, and the like. More specifically, the molded product may be a film, a sheet, and fiber, but is not limited thereto.

Next, the polymer composition according to the second embodiment of the present invention will be described.

According to the second embodiment of the present invention, there is provided a polymer composition containing a polyalkylene carbonate resin and the bio-sourced polyester resin.

In this case, the kinds of polyalkylene carbonate resin and the bio-sourced polyester resin are as described above.

In addition, a content of the polyalkylene carbonate resin may be 1 to 99 wt % and a content of the bio-sourced polyester resin may be 1 to 99 wt %. More specifically, the content of the polyalkylene carbonate resin may be 10 to 99 wt % and the content of the bio-sourced polyester resin may be 10 to 99 wt %.

The composition according to the second embodiment of the present invention may be used for producing a film by processing methods such as extrusion, injection, blowing, and the like. In a case where the composition is used for producing a film, the oxygen permeability is further lowered as compared to a film produced using a bio-sourced polyester resin alone, such that an effect of providing a film having an excellent oxygen barrier property may be achieved.

Specifically, the film satisfying the following Expression 5 may be provided.

F1<F2    [Expression 5]

In Expression 5, F1 is oxygen permeability of the film using the polymer composition and F2 is oxygen permeability of the bio-sourced polyester resin.

The oxygen permeability is measured by ASTM F-1927.

The first and second embodiments of the present invention are only for specifically describing examples of the present invention, but the present invention is not limited thereto.

In addition, the polymer composition may further contain additives usually used in the field, if necessary, for example, a compatibilizer.

The compatibilizer is not limited as long as it is usually used in the field, specifically, examples of the compatibilizer include inorganic particles such as carbon black, titanium oxide, talc, and clay, a pigment, a dye, a dispersant, a defoamer, a lubricant, a plasticizer, a flame retardant, an antioxidant, an antistatic agent, a light stabilizer, a sunscreen agent, a crystallization promoter, and the like.

In the first and second embodiments of the present invention, a method of producing a film may include mixing a polymer composition and extruding the mixed polymer composition into a film.

The polymer composition of the present invention may be produced by various known methods and may be produced in order to obtain a uniform mixture by using a Henschel mixer, a ribbon mixer, and the like. A Banbury mixer, a single or twin screw extruder, and the like may be used in a melt kneading method.

A shape of the polymer composition of the present invention is not particularly limited, and may be a strand shape, a sheet shape, a flat shape, a pellet shape, and the like.

In addition, examples of a method of producing a molded product using a polymer composition include an injection molding method, an extrusion molding method, an inflation method, a T-die method, a calendar method, a blow molding method, a vacuum molding method, a compression molding method, and the like, but are not limited thereto.

According to the third embodiment of the present invention, there is provided a processing aid containing a polyalkylene carbonate resin and for improving thermal processability of one resin or a mixed resin selected from a polyketone resin and a bio-sourced polyester resin.

In the third embodiment of the present invention, the polyalkylene carbonate resin is as described above. By using the polyalkylene carbonate resin, thermal processability of one resin or a mixed resin selected from the polyketone resin and the bio-sourced polyester resin may be further improved.

That is, a sharp increase in viscosity when performing thermal processing may be prevented and processing stability may be further improved.

Hereinafter, the present invention will be described in more detail with reference to examples, but the present invention is not limited to the following examples.

Examples 1 to 7 and Comparative Examples 1 to 3

Compositions of Table 2 were placed into an extruder, a film was produced by extruding the compositions under the same temperature condition as shown in Table 1, and a torque when extruding was measured.

In Table 1, GreenPol Mw 140 k available from SK innovation Co., Ltd. was used as a polypropylene carbonate resin (hereinafter, referred to as "PPC") having a weight average molecular weight of 140,000 g/mol, M620A available from HYOSUNG CORPORATION was used a polyketone resin (hereinafter, referred to as "PK") having a melting point of 210° C. and an MFR of 6.0 g/10 min, the MFR being measured at 240° C. and 2.16 kg according to ASTM D1238, and 4032D available from NatureWorks LLC was used as a polylactic acid resin (hereinafter, referred to as "PLA").

In this case, conditions of the extruder (Brabender GmbH, twin screw extruder TSE 19/40) are as follows.
Screw diameter: 19 mm
Screw rpm: 120 to 150 rpm
Feed rate: 3 to 4 kg/hour

TABLE 1

| | | Zone | | | | |
|---|---|---|---|---|---|---|
| | Hopper | Cylinder 1 | Cylinder 2 | Cylinder 3 | Cylinder 4 | Die |
| Temp. (° C.) | 170 | 210 | 210 | 220 | 220 | 220 |

TABLE 2

| | PPC (wt %) | PLA (wt %) | PK (wt %) | Torque (kg · cm) |
|---|---|---|---|---|
| Example 1 | 80 | — | 20 | 32 to 35 |
| Example 2 | 50 | — | 50 | 34 to 38 |
| Example 3 | 20 | — | 80 | 35 to 39 |
| Example 4 | 80 | 20 | — | 31 to 34 |
| Example 5 | 50 | 50 | — | 35 to 39 |
| Example 6 | 20 | 80 | — | 35 to 39 |
| Example 7 | 40 | 30 | 30 | 36 to 38 |
| Comparative Example 1 | 100 | — | — | 32 to 33 |
| Comparative Example 2 | — | — | 100 | 54 or more |
| Comparative Example 3 | — | 100 | — | 43 to 48 |

As shown in Table 2, it was confirmed that, in the examples of the present invention, the torque when extruding was lowered and the extrusion performance was thus improved by adding the polypropylene carbonate resin.

More specifically, it was confirmed that the torque was lowered by 35% or more in Examples 1 to 3 as compared to Comparative Example 2 and the torque was lowered by 9% or more in Examples 4 to 6 as compared to Comparative Example 3.

In the case where the polyketone resin was used alone as in Comparative Example 2, extrusion was not performed due to the sharp increase in viscosity during processing.

In addition, the pyrolysis temperature was measured using a thermogravimetric analyzer (TGA) manufactured by PerkinElmer Inc.

The film was cut into a size of 3 mm×3 mm and placed onto a fan, a thermal treatment was performed at 100° C. for 30 minutes, cooling was performed to room temperature, and then heating was performed to 700° C. at a rate of 5° C./min to measure a weight reduction. The pyrolysis temperature is defined as a temperature at which a weight reduction rate is reduced by 20% of a weight of the initial loaded film and then calculated.

As shown in FIG. 1, it was confirmed that, in the case of mixing PPC and PK, thermal stability was improved as compared to the case using PPC alone.

In addition, it could be seen that regarding the pyrolysis temperature defined as the temperature at which the weight reduction ratio reaches 20% when measuring pyrolysis by a thermogravimetric analyzer, the pyrolysis temperature was 280° C. in the case of using PPC alone in Comparative Example 1, and the pyrolysis temperature was increased 320 to 350° C. as the content of the polyketone resin is increased as shown in the Examples 1 to 3.

Oxygen permeability of each of the films produced in Examples 4 to 6 and Comparative Examples 1 to 3 was measured and the results are shown in Table 3.

A thickness of the film was 100 μm and oxygen permeability was measured according to ASTM F-1927.

TABLE 3

|  | PPC (wt %) | PLA (wt %) | Oxygen Permeability (cc/m$^2$ · day, 0% R.H) |
| --- | --- | --- | --- |
| Example 4 | 80 | 20 | 370 |
| Example 5 | 50 | 50 | 450 |
| Example 6 | 20 | 80 | 620 |
| Comparative Example 1 | 100 | — | 100 |
| Comparative Example 3 | — | 100 | 1,000 |

As shown in Table 3, the oxygen permeability was further reduced as compared to the case of using PLA alone.

Example 8

In Table 4, GreenPol Mw 140 k available from SK innovation Co., Ltd. was used as PPC and M620A available from HYOSUNG CORPORATION was used as PK.

As a result of viscosity measurement after annealing PPC at 180° C. for 10 minutes, it was confirmed that there was no change in viscosity as shown in Table 4.

As a result of viscosity measurement after annealing PK at 240° C. for 10 minutes, it was confirmed the viscosity was sharply increased from the initial viscosity of 18,000 Pa·s to the viscosity of 39,000 Pa·s as shown in Table 4.

As a result of viscosity measurement after mixing 20 wt % of PPC with 80 wt % of PK and then performing annealing at 240° C. for 10 minutes, it was confirmed that the viscosity was not significantly increased from the initial viscosity of 3,100 Pa·s to the viscosity of 10,200 Pa·s after performing annealing as shown in Table 4, such that extrusion may be performed.

The viscosity was measured using an advanced rheometric expansion system (ARES) available from TA instrument, and the test was performed in a dynamic frequency sweep mode using a parallel plate as a measurement accessory.

TABLE 4

|  | Initial Viscosity (Pa · s) | Viscosity after performing annealing (Pa · s) | Ref. |
| --- | --- | --- | --- |
| 100 wt % of PPC | 1,400 | 1,400 | — |
| 100 wt % of PK | 18,000 | 39,000 | Impossible to perform processing |
| 20 wt % of PPC/80 wt % of PK | 3,100 | 10,200 | Possible to perform processing |

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

The invention claimed is:

1. A polymer composition comprising:
   3 to 40 wt % a polyalkylene carbonate resin;
   30 to 40 wt % of a bio-sourced polyester resin; and
   a residual amount of a polyketone resin.

2. The polymer composition of claim 1, wherein the bio-sourced polyester resin is one or a mixture of two or more selected from the group consisting of polylactic acid, polybutylene succinate, polyhydroxybutyrate, polybutylene adipate terephthalate, and copolymers thereof.

3. The polymer composition of claim 1, wherein the polyalkylene carbonate resin is $C_2$-$C_{12}$ polyalkylene carbonate.

4. The polymer composition of claim 3, wherein the polyalkylene carbonate resin is one or a mixture of two or more selected from the group consisting of polyethylene carbonate, polypropylene carbonate, polypentene carbonate, polyhexene carbonate, polyoctene carbonate, polycyclohexene carbonate, and copolymers thereof.

5. The polymer composition of claim 1, wherein the polyketone resin is a linear alternating polyketone resin containing carbon monoxide and at least one kind of ethylenically unsaturated hydrocarbon.

6. The polymer composition of claim 1, wherein the polyketone resin has a melting point of 175 to 300° C. and a melt mass-flow rate (MFR) of 1 to 30 g/10 min, the MFR being measured at 240° C. and 2.16 kg according to ASTM D1238.

7. The polymer composition of claim 1, wherein a viscosity of the polymer composition satisfies the following Expressions 1 and 2:

$$A1 > A2 \qquad \text{[Expression 1]}$$

in Expression 1, A1 is an initial viscosity of the polyketone resin measured at 240° C. and A2 is an initial viscosity of the polymer composition obtained by mixing the polyketone resin and the polyalkylene carbonate resin, the initial viscosity of the polymer composition being measured at 240° C., and $$A1 > A3 \qquad \text{[Expression 2]}$$

in Expression 2, A1 is an initial viscosity of the polyketone resin measured at 240° C. and A3 is an initial viscosity of the polymer composition obtained by mixing the polyketone resin and the polyalkylene carbonate resin, the initial viscosity of the polymer composition being measured after performing annealing at 240° C. for 10 minutes.

8. The polymer composition of claim 1, wherein a pyrolysis temperature of the polymer composition defined as a temperature at which a weight reduction ratio of the polymer composition reaches 20% when measuring pyrolysis by a thermogravimetric analyzer satisfies the following Expression 3:

$$T1<T2 \quad \text{[Expression 3]}$$

in Expression 3, T1 is a pyrolysis temperature of the polyalkylene carbonate resin and T2 is a pyrolysis temperature of the polymer composition obtained by mixing the polyketone resin and the polyalkylene carbonate resin.

9. The polymer composition of claim 8, wherein T1 is lower than 300° C. and T2 is 300° C. or higher.

10. The polymer composition of claim 1, wherein the polymer composition satisfies the following Expression 4:

$$P1<P2 \quad \text{[Expression 4]}$$

in Expression 4, P1 is a torque range when extruding the polymer composition and P2 is a torque range when extruding the polyketone resin.

11. A molded product using the polymer composition of claim 1.

12. The molded product of claim 11, wherein the molded product is a film.

* * * * *